(12) United States Patent
Müller et al.

(10) Patent No.: US 8,460,743 B2
(45) Date of Patent: Jun. 11, 2013

(54) COATING PROCESS FOR OPHTHALMIC LENSES

(75) Inventors: Achim Müller, Grossostheim (DE); Katharina Schmid, Aschaffenburg (DE)

(73) Assignee: Novartis AG, Basel (CH)

( * ) Notice: Subject to any disclaimer, the term of this patent is extended or adjusted under 35 U.S.C. 154(b) by 393 days.

(21) Appl. No.: 12/381,694

(22) Filed: Mar. 16, 2009

(65) Prior Publication Data
US 2009/0238948 A1    Sep. 24, 2009

(30) Foreign Application Priority Data
Mar. 18, 2008   (EP) .................................... 08152918

(51) Int. Cl.
*B05D 1/36* (2006.01)
*B05D 3/04* (2006.01)
*G02C 7/04* (2006.01)

(52) U.S. Cl.
USPC .................. 427/2.1; 351/159.01; 351/159.33; 514/912; 514/915

(58) Field of Classification Search
USPC .. 427/2.1; 351/159, 159.01, 159.33; 514/912, 514/915
See application file for complete search history.

(56) References Cited

U.S. PATENT DOCUMENTS

| | | | |
|---|---|---|---|
| 4,132,695 A * | 1/1979 | Burkholder | 524/547 |
| 4,168,112 A | 9/1979 | Ellis et al. | 351/160 |
| 4,321,261 A | 3/1982 | Ellis et al. | 424/180 |
| 4,455,382 A * | 6/1984 | Wu | 501/2 |
| 4,941,997 A | 7/1990 | Decher et al. | 252/586 |
| 4,973,429 A | 11/1990 | Decher et al. | 252/587 |
| 5,068,318 A | 11/1991 | Decher et al. | 534/573 |
| 5,171,526 A * | 12/1992 | Wong et al. | 422/28 |
| 5,208,111 A | 5/1993 | Decher et al. | 428/420 |
| 5,509,899 A | 4/1996 | Fan et al. | 604/96 |
| 5,518,767 A | 5/1996 | Rubner et al. | 427/259 |
| 5,529,727 A | 6/1996 | LaBombard et al. | 264/1.36 |
| 5,536,573 A | 7/1996 | Rubner et al. | 428/378 |
| 5,700,559 A | 12/1997 | Sheu et al. | 428/319.7 |
| 5,882,687 A | 3/1999 | Park et al. | 424/682 |
| 6,011,082 A | 1/2000 | Wang et al. | 523/107 |
| 6,323,165 B1 | 11/2001 | Heiler et al. | 510/112 |

(Continued)

FOREIGN PATENT DOCUMENTS

| | | |
|---|---|---|
| EP | 0 032 443 | 6/1985 |
| EP | 0 138 385 | 4/1990 |

(Continued)

OTHER PUBLICATIONS

"PBS TabletsL Phosphate Buffered Saline pH 7.4" Medicago AB Product Sheet, Jul. 27, 2007, XP002543529.*

(Continued)

*Primary Examiner* — Timothy Meeks
*Assistant Examiner* — Cachet Sellman
(74) *Attorney, Agent, or Firm* — Jian Zhou

(57) ABSTRACT

The present invention generally relates to a method for coating ophthalmic lenses, preferably contact lenses, more preferably silicone hydrogel contact lenses. In particular, the present invention is directed to a method for forming a coating comprising a polyionic material on a contact lens, preferably a silicone hydrogel contact lens, directly in the primary package and maintaining the coated contact lens within said primary package until insertion of the coated contact lens in the eye of the contact lens user.

20 Claims, 2 Drawing Sheets

U.S. PATENT DOCUMENTS

| | | | |
|---|---|---|---|
| 6,451,871 B1 | 9/2002 | Winterton et al. | 523/106 |
| 6,491,851 B1 | 12/2002 | Keller et al. | 264/1.32 |
| 6,531,432 B2 | 3/2003 | Molock et al. | 510/112 |
| 6,623,747 B1 * | 9/2003 | Chatelier et al. | 424/422 |
| 6,699,435 B2 | 3/2004 | Salpekar et al. | 422/40 |
| 6,719,929 B2 * | 4/2004 | Winterton et al. | 264/1.7 |
| 6,878,399 B2 * | 4/2005 | Chabrecek et al. | 427/162 |
| 6,896,926 B2 * | 5/2005 | Qiu et al. | 427/2.31 |
| 2001/0045676 A1 | 11/2001 | Winterton et al. | 264/2.5 |
| 2001/0048975 A1 | 12/2001 | Winterton et al. | 427/412.1 |
| 2002/0006493 A1 | 1/2002 | Chabrecek et al. | 428/64.1 |
| 2002/0086160 A1 | 7/2002 | Qiu et al. | 428/413 |
| 2002/0182316 A1 | 12/2002 | Gilliard et al. | 427/162 |
| 2003/0008154 A1 | 1/2003 | Aguado et al. | 428/447 |
| 2003/0012872 A1 | 1/2003 | Qiu et al. | 427/162 |
| 2003/0039742 A1 | 2/2003 | Qiu et al. | 427/2.1 |
| 2003/0052424 A1 | 3/2003 | Turner et al. | 264/1.32 |
| 2003/0117579 A1 | 6/2003 | Morris et al. | 351/200 |
| 2003/0125498 A1 | 7/2003 | McCabe et al. | 528/25 |
| 2003/0134132 A1 | 7/2003 | Winterton et al. | 428/451 |
| 2003/0143335 A1 | 7/2003 | Qiu et al. | 427/430.1 |
| 2003/0162862 A1 | 8/2003 | McCabe et al. | 523/106 |
| 2004/0018295 A1 | 1/2004 | Qiu et al. | 427/2.1 |
| 2004/0047979 A1 | 3/2004 | Qiu et al. | 427/2.1 |
| 2004/0067365 A1 | 4/2004 | Qiu | 428/411.1 |
| 2004/0108607 A1 | 6/2004 | Winterton et al. | 264/1.32 |
| 2006/0073185 A1 * | 4/2006 | Jani et al. | 424/427 |
| 2008/0226922 A1 * | 9/2008 | Ferreiro et al. | 428/413 |
| 2008/0307751 A1 | 12/2008 | Newman et al. | 53/425 |

FOREIGN PATENT DOCUMENTS

| | | |
|---|---|---|
| EP | 0 995 762 | 4/2000 |
| GB | 2 102 070 | 1/1983 |
| JP | 01158412 | 2/1980 |
| JP | 01050014 A | 2/1989 |
| JP | 5-318118 | 12/1993 |
| JP | 07256844 A | 10/1995 |
| JP | 07266443 A | 10/1995 |
| WO | WO 95/00618 | 1/1995 |
| WO | WO 95/02251 | 1/1995 |
| WO | WO 95/20407 | 8/1995 |
| WO | WO 96/18498 | 6/1996 |
| WO | WO 96/31792 | 10/1996 |
| WO | WO 96/37241 | 11/1996 |
| WO | WO 99/35520 | 7/1999 |
| WO | WO 01/57118 | 8/2001 |
| WO | WO 01/92924 | 12/2001 |
| WO | WO 02/16974 | 2/2002 |
| WO | WO 02/097481 | 12/2002 |
| WO | WO 03/066714 | 8/2003 |
| WO | WO 2006038080 A2 * | 4/2006 |

OTHER PUBLICATIONS

Decher, Lehr, Lowack, Lvov & Schmitt, "New nanocomposite films for biosensors: layer-by-layer adsorbed films of polyelectrolytes, proteins or DNA" 1994, Biosensors & Bioelectronics 9 677-684.

Sukhorukov, Mohwald, Decher & Lvov, "Assembly of polyelectrolyte multilayer films by consecutively alternating adsorption of polynucleotides and polycations" 1996, Thin Solid Films 220-223.

Uchida, Kunitake and Kajiyama, "Blood COmpatibility-surface characteristic relationships of a Langmuir-Blodgett film composed of an anionic amphiphile-polycation complex" 1994, New Polymeric Mater. vol. 4, No. 3, pp. 199-211.

Onitsuka, Fou, Ferreira, Hsieh and Rubner, "Enhancement of light emitting diodes based on self-assembled heterostructures of poly(p-phenylene vinylene)", 1996, 4067-4071.

Yoo, Lee and Rubner, "Investigations of new self-assembled multilayer films based on alternately adsorbed layers of polyelectrolytes and functional dye molecules", 1996, Mat. Res. Soc. Symp. Proc. vol. 413, 395-400.

Yoo, Wu, Lee and Rubner, "New electro-active self-assembled multilayer thin films based on alternatively adsorbed layers of polyelectrolytes and functional dye molecules", 1997, Synthetic Metals 85 pp. 1425-1426.

Yoo & Rubner, "Layer-by-layer modification of surfaces through the use of self-assembled monolayers of polyions" 1995.

Ferreira & Rubner, "Molecular-level Processing of COnjugated Polymers. 1. Layer-by-layer Manipulation of Conjugated Poluions", 1995, 7107-7114.

Fon & Rubner, "Molecular-level processing of conjugated polymers. 2. Layer-by-layer manipulation of in-situ polymerized p-type doped conducting polymers", 1995, 7115-7120.

Cherung, Stockton & Rubner,"Molecular-level processing of conjugated polymers. 3. Layer-by-layer manipulation of polyaniline via electrostatic interactions", 1997, 2712-2716.

Vargo, Calvert, Wynne, Avlyanov, MacDiarmid & Rubner, "Patterned polymer multilayer fabrication by controlled adhesion of polyelectrolytes to plasma modified fluoropolymer surfaces" 1995, 169-174.

Cheung, Fou, Ferreira and Rubner, "Molecular Self-Assembly of Conducting Polymers: A New layer-by-layer thin film Deposition Process" 757-758.

"PBS Tablets: Phosphate Buffered Saline pH 7.4", Medicago AB, Product Sheet, Jul. 27, 2007, XP-002543529, Uppsala, Sweden, Retrieved from the Internet: URL:http://www.medicago.se.

"Medicago AB introduces buffer production in tablet form" Medicago AB, May 15, 2006, XP-002543530, Uppsala, Sweden, Retrieved from the Internet: URL:http://www.medicago.se/_filer/buffer-tables-article.pdf PCT International Search Report and PCT Written Opinion of the International Searching Authority dated Sep. 16, 2009.

* cited by examiner

COATING PROCESS FOR OPHTHALMIC LENSES

This application claims benefit under 35 USC §119 of European patent application No. EP 08152918.2 filed Mar. 18, 2008, the contents of which are incorporated herein by reference in its entirety.

The present invention generally relates to a method for coating ophthalmic lenses, preferably contact lenses, more preferably silicone hydrogel contact lenses. In particular, the present invention is directed to a method for forming a coating on a contact lens, preferably a silicone hydrogel contact lens, directly in the primary package and maintaining the coated contact lens within said primary package until insertion of the coated contact lens in the eye of the contact lens user.

BACKGROUND OF THE INVENTION

It is generally known in the art, that polyelectrolytes are suitable for surface precipitation from the solution, i.e. for forming layers or coatings on a surface. For example WO-A-02/09865 discloses a method of producing nano- or microcapsules comprising a polyelectrolyte casing by surface precipitation from the solution onto the surface of template particles.

Many devices used in biomedical applications require that the bulk of the device has one property, while the surface of the device has another property. For example, contact lenses may have high oxygen permeability through the lens to maintain good corneal health. However, materials that exhibit exceptionally high oxygen permeability (e.g. polysiloxanes) are typically hydrophobic and will adhere to the eye. Thus, such a contact lens generally has a core or bulk material that is highly oxygen permeable and hydrophobic, and a surface that has been treated or coated to increase hydrophilic properties, thereby allowing the lens to freely move on the eye without adhering.

As a result, a number of methods of consistently and permanently altering the surface properties of contact lenses, have been developed.

WO-A-99/35520 discloses a layer-by-layer ("LbL") polymer absorption process comprising the steps of consecutively dipping a substrate into oppositely charged polyionic materials until a coating of a desired thickness is formed.

WO-A-01/57118 discloses a method for forming a coating of polyionic material on a contact lens by dipping the contact lens into a (single) solution containing a polyanionic material and a polycationic material in a non-stoichiometric amount and maintained within a certain pH-range.

U.S. Pat. No. 6,451,871 discloses a method for coating an ophthalmic lens in the primary package comprising the steps of forming a polyionic coating solution comprising a negatively and/or positively charged polyionic material; contacting an ophthalmic lens with said solution in the primary package for said lens; forming a coating on said ophthalmic lens, said coating comprising said charged material; and maintaining said lens in said package with the remaining after-solution until insertion of the lens in the eye of the ophthalmic lens user.

All prior art approaches so far comprise several handling steps, including preconditioning, dipping, rinsing and thereafter packaging.

As such, a need currently exists for an improved method of coating a material, such as an ophthalmic lens, preferably a contact lens, with polyelectrolyte coatings (i.e. polyionic coatings). In particular, a need exists for an improved polyionic deposition technique that requires less manufacturing time and handling steps than the previously-described layer-by-layer deposition technique.

SUMMARY OF THE INVENTION

Accordingly, an object of the present invention is to provide an improved method of treating ophthalmic lenses, preferably contact lenses, to alter surface properties.

It is another object of the present invention to provide an improved method of treating ophthalmic lenses, preferably contact lenses with polyionic materials to alter the hydrophilic or hydrophobic nature of their surfaces.

Still another object of the present invention is to provide an improved method of coating an ophthalmic lens, preferably a contact lens with a polyanionic and/or a polycationic material.

Surprisingly it has now been found that with the method of the present invention a coated ophthalmic lens, preferably a coated contact lens, can be provided directly in the primary package (for definition of "primary package" see below) in an ophthalmically compatible storage solution (i.e. after-coating solution).

The invention thus in one aspect relates to a method of coating an ophthalmic lens, preferably a contact lens, directly in the primary package comprising the steps of:

(a) forming a first polyionic coating solution, said solution comprising at least one negatively-charged or positively-charged polyionic material, or a mixture of at least one negatively charged polyionic material and at least one positively charged polyionic material provided that the molar charge ratio of at least one negatively charged polyionic material to at least one positively charged polyionic material in said mixture is from 1:100 to 100:1, (b) optionally forming a second polyionic coating solution, said solution comprising at least one negatively-charged or positively-charged polyionic material, or a mixture of at least one negatively charged polyionic material and at least one positively charged polyionic material provided that the molar charge ratio of said mixture of at least one negatively charged polyionic material to at least one positively charged polyionic material in said mixture is from 1:100 to 100:1, (c) contacting an ophthalmic lens with said first solution in the primary package for said ophthalmic lens;

(d) optionally adding said second solution to said first solution and said ophthalmic lens in said primary package;

(e) forming a coating on said ophthalmic lens, said coating comprising said negatively charged material and/or said positively charged material;

(f) sealing the primary package;

(g) maintaining said coated ophthalmic lens in said primary package with the remaining after-coating solution until insertion of the ophthalmic lens in the eye of the ophthalmic lens user;

characterized in that before sealing the primary package, a tablet (T) for adjusting the pH in the primary package is added.

An "ophthalmic lens", as used herein, refers to any lens intended for use in intimate contact with the eye of the user. This includes, without limitation, intraocular lenses, ocular implants, hard contact lenses, soft contact lenses, and corneal onlays. Preferably an ophthalmic lens is a contact lens. More preferably an ophthalmic lens is a silicone hydrogel contact lens.

A "silicone hydrogel contact lens" refers to a lens which can absorb at least 10% by weight of water when it is fully hydrated and comprises a polymeric material which is a copolymerization product of a polymerizable composition which includes one or more of a silicone-containing monomer, a silicone-containing macromer, and a silicone-containing prepolymer.

"Ophthalmically compatible material" or "ophthalmically compatible surface", as used herein, refers to a material or surface of a material which may be in intimate contact with the ocular environment (i.e. ocular fluids (e.g., tear fluid) and ocular tissue (e.g., the cornea)) and which may come into intimate contact with a contact lens for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of protein or lipid adsorption, and will not cause substantial wearer discomfort during the prescribed period of wear. The same applies to an "ophthalmically compatible solution" adhering to a contact lens. Preferably, an "ophthalmically compatible solution" is characterized by at least having a pH in the range of from 6.7 to 7.7 and an osmolarity from 270 to 350 mOsmol/kg.

A "primary package" as used herein, refers to a package directly comprising the ophthalmic lens as to be used by the ophthalmic lens user. A typical primary package may be a blister package (as for example disclosed in EP-A-0680895 or EP-A-0233581) comprising a shell or base portion sealed with a laminated foil or cover. A primary package usually contains one contact lens in a small amount of an ophthalmically compatible solution (as for example a saline buffer solution). Typically, the contact lens is sterilized (e.g. in an autoclave) in the sealed primary package.

In accordance with the present invention, a "polyionic solution" is employed to coat the substrate. In general, the polyionic coating solution contains at least one polycationic material (i.e. positively charged material) and/or at least one polyanionic material (i.e. negatively charged material), although more than one of each polyionic material can be employed. In one embodiment, for example, the polyionic solution is a solution containing a polycation. In another embodiment, for example, the polyionic solution is a solution containing a polyanion. In still another embodiment, for example, the polyionic solution is a bi-component solution containing a polycation and a polyanion.

Typically, a polycationic material of the present invention can include any material known in the art to have a plurality of positively charged groups along a polymer chain. For example, in one embodiment, the polycationic material includes poly(allyl amine hydrochloride) (PAH). In another embodiment, the polycationic material includes polyamido amine epichlorhydrine (PAE). In still another embodiment, the polycationic material includes chitosan. Preferably the polycationic material is polyamido amine epichlorhydrine (PAE) or chitosan.

"Chitosan" as used herein is a polycationic polymer comprising more than 5000 glucosamine units. It may be obtained commercially from shrimp and crabshell chitin by alkaline deacetylation although in commercial samples the degree of the N-deacetylation is almost never complete. Chitosan has found application as an antimicrobial agent against fungi, bacteria, and viruses (for a review, see Rabea, et al., Biomacromolecules 4 (6), 1457-1465, 2003).

Likewise, a polyanionic material of the present invention can typically include any material known in the art to have a plurality of negatively charged groups along a polymer chain. For example, in one embodiment, the polyanionic material includes polyacrylic acid (PAA). In another embodiment, the polyanionic material includes carboxymethyl cellulose (CMC). In still another embodiment, the polyanionic material includes poly(styrene sulfonate) (PSS). Preferably the polyanionic material is polyacrylic acid (PAA) or carboxymethyl cellulose (CMC).

According to the present invention, one or more polycationic materials form the polyionic solution, one or more polyanionic materials form the polyionic solution, or one or more polycationic materials are combined with one or more polyanionic materials to form the polyionic solution. In general, the polyionic components may be added in stoichiometric amounts or in non-stoichiometric amounts, such that one of the components is present within the solution in a greater amount than another component. Preferably, the molar charge ratio, as defined herein, can be from 1:100 to 100:1 (polyanion:polycation). In a more preferred embodiment, the molar charge ratio is from 1:10 to 10:1 (polyanion:polycation). Most preferably the molar charge ratio is about 1:1.

By altering the molar charge ratio, a polyionic solution of the present invention can be "self-cascaded" onto an ophthalmic lens. In other words, when the ophthalmic lens is contacted with the solution, alternating layers of polyionic components can be coated onto the ophthalmic lens. For example, in one embodiment, polyanionic-polycationic-polyanionic alternating repeating layers are assembled when the ophthalmic lens is contacted with the solution. In another embodiment, polycationic-polyanionic-polycationic alternating repeating layers are assembled when the ophthalmic lens is contacted with the solution.

Besides containing polyionic components, a polyionic solution of the present invention can also contain various other materials. For example, the polyionic solution can contain antimicrobials, antibacterials, radiation-absorbing materials, cell growth inhibitors, etc. Said various other materials can be incorporated into the coating on the ophthalmic lens or can remain in the after-coating solution in the primary package with the ophthalmic lens.

As noted above in a method according to the present invention, after forming the polyionic solution, an ophthalmic lens is contacted with the solution and a coating is formed thereon.

In contrast to the heretofore-mentioned layer-by-layer processes, a process of the present invention can apply a polyionic coating to an ophthalmic lens within the primary package, i.e. without removal or extraction. The ophthalmic lens, as well as the remaining after-coating solution in the primary package are ophthalmically compatible.

Other objects, features and aspects of the present invention are discussed in greater detail below.

DESCRIPTIONS OF THE PREFERRED EMBODIMENTS OF THE INVENTION

Figure 1:
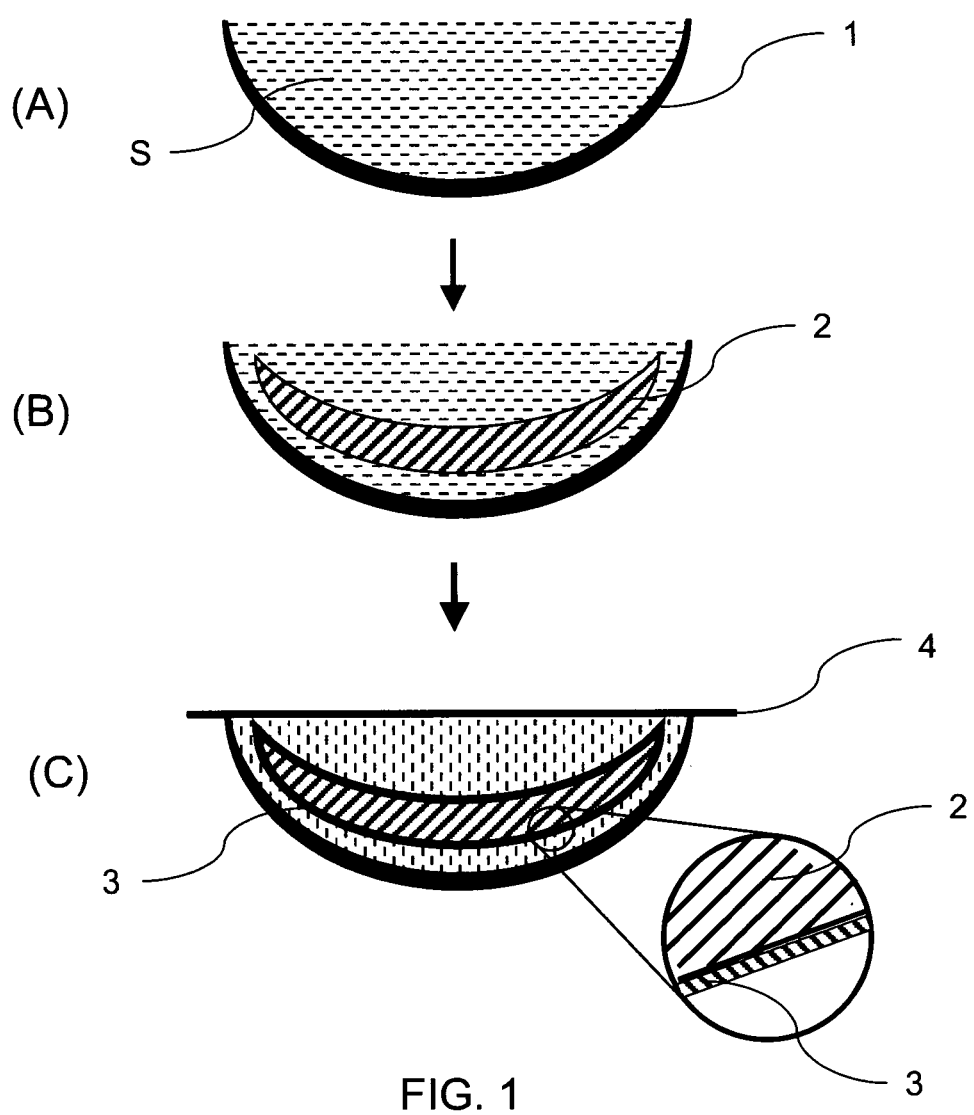
FIG. 1(A) shows a primary package filled with a polyionic coating solution.
FIG. 1(B) shows a primary package of FIG. 1(A) comprising a contact lens.
FIG. 1(C) shows a sealed primary package comprising a coated contact lens therein.
Figure 2:
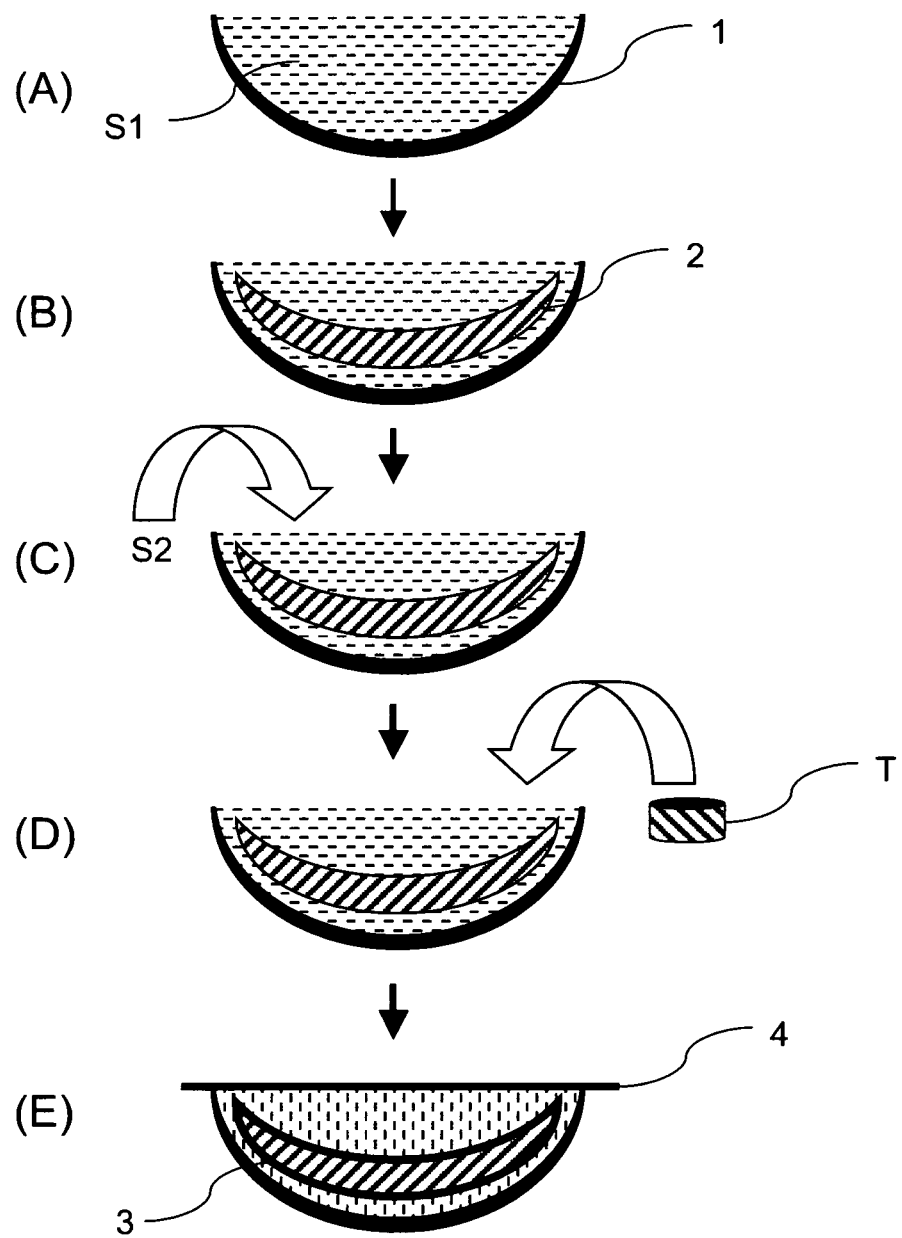
FIG. 2(A) shows a primary package filled with a first polyionic coating solution.
FIG. 2(B) shows a primary package of FIG. 2(A) comprising a contact lens.
FIG. 2(C) shows a primary package of FIG. 2(B) whereto a second polyionic coating solution is added.
FIG. 2(D) shows a primary package of FIG. 2(C) whereto a tablet for adjusting the pH in the primary package is added.
FIG. 2(E) shows a sealed primary package comprising a coated contact lens therein.

In general, the present invention is directed to an improved and accelerated method for coating an ophthalmic lens, preferably a contact lens.

A method according to the invention for coating an ophthalmic lens, preferably a contact lens, directly in the primary package comprises the steps of:
- (a) forming a first polyionic coating solution, said solution comprising at least one negatively-charged or positively-charged polyionic material, or a mixture of at least one negatively charged polyionic material and at least one positively charged polyionic material provided that the molar charge ratio of said at least one negatively charged polyionic material to said at least one positively charged polyionic material in said mixture is from 1:100 to 100:1,
- (b) optionally forming a second polyionic coating solution, said solution comprising at least one negatively-charged polyionic or positively-charged material, or a mixture of at least one negatively charged polyionic material and at least one positively charged polyionic material provided that the molar charge ratio of said at least one negatively charged polyionic material to said at least one positively charged polyionic material in said mixture is from 1:100 to 100:1,
- (c) contacting an ophthalmic lens with said first solution in the primary package for said ophthalmic lens;
- (d) optionally adding said second solution to said first solution and said ophthalmic lens in said primary package;
- (e) forming a coating on said ophthalmic lens, said coating comprising said negatively charged material and/or said positively charged material;
- (f) sealing the primary package;
- (g) maintaining said coated ophthalmic lens in said primary package with the remaining after-coating solution until insertion of the ophthalmic lens in the eye of the ophthalmic lens user;

characterized in that before sealing the primary package, a tablet (T) for adjusting the pH in the primary package is added.

In a preferred embodiment the method comprises the steps of:
- (a) forming a first polyionic coating solution, said solution comprising at least one positively charged polyionic material,
- (b) forming a second polyionic coating solution, said solution comprising at least one negatively charged polyionic material,
- (c) contacting an ophthalmic lens with said first solution in the primary package for said ophthalmic lens;
- (d) adding said second solution to said first solution and said ophthalmic lens in said primary package;
- (e) forming a coating on said ophthalmic lens, said coating comprising said negatively charged material and said positively charged material;
- (f) sealing the primary package;
- (g) maintaining said coated ophthalmic lens in said primary package with the remaining after-coating solution until insertion of the ophthalmic lens in the eye of the ophthalmic lens user;

characterized in that before sealing the primary package, a tablet (T) for adjusting the pH in the primary package is added.

In another preferred embodiment the method comprises the steps of:
- (a) forming a first polyionic coating solution, said solution comprising at least one negatively charged polyionic material,
- (b) forming a second polyionic coating solution, said solution comprising at least one positively charged polyionic material,
- (c) contacting an ophthalmic lens with said first solution in the primary package for said ophthalmic lens;
- (d) adding said second solution to said first solution and said ophthalmic lens in said primary package;
- (e) forming a coating on said ophthalmic lens, said coating comprising said negatively charged material and said positively charged material;
- (f) sealing the primary package;
- (g) maintaining said coated ophthalmic lens in said primary package with the remaining after-coating solution until insertion of the ophthalmic lens in the eye of the ophthalmic lens user;

characterized in that before sealing the primary package, a tablet (T) for adjusting the pH in the primary package is added.

In a further preferred embodiment the method comprises the steps of:
- (a) forming a polyionic coating solution, said solution comprising at least one negatively charged polyionic material and at least one positively charged polyionic material, wherein the molar charge ratio of said at least one negatively charged polyionic material and at least one positively charged polyionic material is from 1:100 to 100:1,
- (c) contacting an ophthalmic lens with said solution in the primary package for said ophthalmic lens;
- (e) forming a coating on said ophthalmic lens, said coating comprising said negatively charged material and said positively charged material;
- (f) sealing the primary package;
- (g) maintaining said coated ophthalmic lens in said primary package with the remaining after-coating solution until insertion of the ophthalmic lens in the eye of the ophthalmic lens user;

characterized in that before sealing the primary package, a tablet (T) for adjusting the pH in the primary package is added.

Preferably the molar charge ratio of said at least one negatively charged polyionic material and at least one positively charged polyionic material is from 11:10 to 10:1.

Step (c) preferably comprises (c10) dispensing said (first) solution into a primary package; and (c20) placing an ophthalmic lens into said (first) solution in the primary package; or step (c) preferably comprises (c11) placing an ophthalmic lens in the primary package; and (c22) dispensing said (first) solution into the primary package comprising said ophthalmic lens.

In a more preferred method according to the invention, the coating on said ophthalmic lens in step (e) is formed without further action.

In another more preferred embodiment of the invention, the forming of the coating in step (e) is induced by one of the following actions or a combination of at least two of the following actions:

(e1) mixing said solution in the primary package using ultrasound;
(e2) changing the pH value of said solution in the primary package;
(e3) changing the osmolarity of said solution in the primary package;
(e4) adding one or more salts to the solution in the primary package;
(e5) adding one or more polyelectrolytes to the solution in the primary package;
(e6) adding one or more solvents to the solution in the primary package;
(e7) changing the temperature of the solution in the primary package.

Before sealing the primary package, and after a time sufficient to form the coating on the ophthalmic lens, the pH in the primary package is adjusted to an ophthalmically compatible pH by adding a tablet comprising an acid, a base or a buffer.

The method according to the invention is carried out in a sequence comprising steps as shown in FIG. 1(A), FIG. 1(B) and FIG. 1(C).

First, a primary package (1) is filled with a polyionic solution (S). Second, a contact lens (2) is placed in the solution in the primary package. Third, the primary package is sealed, e.g. with a sealing foil (4) and the contact lens in the sealed primary package is coated with a coating (3) according to the method of the present invention.

In one embodiment, the method according to the invention is carried out in a sequence as shown in FIG. 2(A), FIG. 2(B), FIG. 2(C), FIG. 2(D) and FIG. 2(E).

First, a primary package (1) is filled with a first polyionic solution (S1). Second, a contact lens (2) is placed in the solution in the primary package. Third, a second polyionic solution (S2) is added to the contact lens (2) in the primary package. Fourth, a tablet (T) for adjusting the pH in the primary package is added. Fifth, the primary package is sealed, e.g. with a sealing foil (4) and the contact lens in the sealed primary package is coated with a coating (3) according to the method of the present invention.

To form a coated ophthalmic lens in a method of the present invention, a polyionic coating solution is initially formed. As stated, a polyionic coating solution of the present invention includes polyionic materials, such as polyanionic and/or polycationic materials. For instance, a first material may be a polycationic material, which can include any material known in the art to have a plurality of positively charged groups along a polymer chain. Such materials can include, but are not limited to:

(a) poly(allylamine hydrochloride) (PAH)
(b) poly amido amine epichlorhydrin (PAE)
(c) poly imine epichlorhydrin (PIE)
(d) chitosan
(e) poly(ethyleneimine) (PEI)
(f) poly(vinylbenzyltriamethylamine) (PVBT)
(g) polyaniline (PAN)
(h) polypyrrole (PPY)
(i) poly(pyridinium acetylene) or
(j) quaternized copolymer of vinylpyrrolidone and dimethylaminomethylmethacrylate.

Preferred polycationic material are poly(allylamine hydrochloride) (PAH), polyamido amine epichlorhydrine (PAE), quaternized vinylpyrrolidone/dimethylaminomethylmethacrylate copolymer (e.g., hydrochloride salt of vinylpyrrolidone/dimethylaminomethylmethacrylate copolymer or polyquaternium-11), and Chitosan. More preferably the polycationic material is polyamido amine epichlorhydrine (PAE) or chitosan.

Moreover, a second material may be a polyanionic material, which can generally include any material known in the art to have a plurality of negatively charged groups along a polymer chain. For example, suitable anionic materials can include, but are not limited to:

(a) polyacrylic acid (PAA)
(b) carboxy methyl cellulose (CMC)
(c) alginate
(d) poly(thiophene-3-acetic acid) (PTAA)
(e) poly(styrene sulfonate) (PSS) or
(f) copolymer of vinylpyrrolidone/acrylic acid.

Preferred polyanionic materials are poly acrylic acid (PAA), copolymer of vinylpyrrolidone/acrylic acid, carboxy methyl cellulose (CMC) and poly(styrene sulfonate) (PSS). More preferably the polyanionic material is polyacrylic acid (PAA) or carboxymethyl cellulose (CMC).

In order to alter various characteristics of the coating, such as thickness, the molecular weight of the polyionic materials can be varied. In particular, as the molecular weight is increased, the coating thickness generally increases. However, if the increase in molecular weight is too substantial, the difficulty in handling may also increase. As such, polyionic materials used in a process of the present invention will typically have a number average molecular weight $M_n$ of 10,000 to 500,000. In certain preferred embodiments, the number average molecular weight is 25,000 to 250,000, and in other more preferred embodiments from 50,000 to 100,000.

In addition to polyionic materials, a coating solution of the present invention can also contain additives. For example, active agents, such as antimicrobials and/or antibacterials can be added to a coating solution of the present invention, particularly when used in biomedical applications. Some antimicrobial polyionic materials include polyquaternary ammonium compounds, such as those described in U.S. Pat. No. 3,931,319 (e.g. POLYQUAD®).

Moreover, other examples of materials that can be added to a coating solution of the present invention are polyionic materials useful for ophthalmic lenses, such as materials having radiation absorbing properties. Such materials can include, for example, visibility tinting agents, iris color modifying dyes, and ultraviolet (UV) light tinting dyes.

When additives are applied to a coating solution of the present invention, it is generally desired that the additives have some charge. By having a positive or negative charge, the additive can be partly or completely substituted for one of the polyionic materials in solution. For example, polyquaternary ammonium compounds typically have a positive charge. As such, these compounds can be partly or completely substituted into a solution of the present invention for the polycationic component such that the additive is applied to an ophthalmic lens material in a manner similar to how a polycationic would be applied.

Regardless of the number of polyionic components present within a coating solution of the present invention, it is possible that one of the polyionic components of the solution be present in a greater amount than another component such that a non-stoichiometric solution can be formed. For example, when a polyanionic/polycationic bi-component solution is formed, either one of the polyionic components can be present in an amount greater than the other component.

To control the amount of each polyionic component within a coating solution, the molar charge ratio can be varied. As used herein, "molar charge ratio" is defined as the ratio of ionic groups or charged functional groups in the solution on a molar basis. For example, a 10:1 molar charge ratio can be defined as 10 charged functional groups of a polyanion to 1 charged functional group of a polycation. For a molar charge ratio of 1:1, an amount of 10 molecules of said polycation and 1 molecule of said polyanion would be required. The molar charge ratio can be determined as defined above for any number of components within a solution, as long as at least one polycation and one polyanion are included therein.

A polyionic coating solution typically has a molar charge ratio from 1:100 to 100:1. In one embodiment, the coating solution has a molar charge ratio of about 10:1 (polyanion polycation). In another embodiment, the coating solution has a molar charge ratio of about 1:10 (polyanion:polycation). In still another embodiment, a 5:1 or 1:5 molar charge ratio may be utilized. In a preferred embodiment, the coating solution has a molar charge ratio of about 1:1 (polyanion:polycation).

By employing a coating solution having a predominant amount of polyanionic material, a substrate material can be coated in a manner such that the outer layer is a polyanionic material. Substrates having an outer polyanionic material are typically more acidic. It is believed that in some applications, an acidic outer layer can provide a more hydrophilic substrate and allow better wetting. However, it should be understood that an outer layer of polycationic material may also be desirable (e.g. antibacterial properties if quaternary amines are used as polycations). In contrast to a polyanionic outer coating, a polycationic outer coating can be achieved by providing a coating solution that contains a predominant amount of polycationic material.

The pH range for an after-coating solution can vary depending on the particular polyionic materials chosen. Any suitable method known in the art can be utilized to adjust the pH to an appropriate pH range for a given solution. According to the invention, the pH is adjusted by adding a tablet, which releases slowly or lagged either an acid or a base or a buffer, to the after-coating solution in the primary package. In another conceivable embodiment, the tablet may already be in the primary package before the first and or second solution is added. Preferably, the tablet is an alkaline tablet.

In accordance with the present invention, a polyionic coating solution as described above, can be prepared in a variety of ways. In particular, a polyionic coating solution of the invention can be formed by dissolving the polyionic materials in aqueous solutions or any other material that sufficiently dissolves the material. When a solvent is used, any solvent that can allow the components within the coating solution to remain stable in water is suitable. For example, an alcohol-based solvent can be used. Suitable alcohols can include, but are not limited to, ethanol, isopropyl alcohol, hexanol, etc., with ethanol being preferred. It should be understood that other solvents commonly used in the art can also be suitably used in the present invention.

Whether dissolved in water or in a solvent, the concentration of the polyionic materials within a coating solution of the present invention can generally vary depending on the particular materials being utilized, the desired coating thickness, and a number of other factors. However, it may be typical to formulate a relatively dilute aqueous solution of polyionic material. For example, a polyionic material concentration can be between 0.001% to 0.5% by weight, between 0.005% to 0.10% by weight, or between 0.01% to 0.05% by weight.

A bi-component polyionic coating solution suitable for the method of the present invention can be prepared as follows: First dissolving a single component polyanionic material in water, a buffer or other solvent at a designated concentration to form a polyanionic solution. For example, in one embodiment, a solution of polyacrylic acid having a molecular weight of about 90,000 is prepared by dissolving a suitable amount of the material in water to form a 0.001% PAA solution. The pH of the polyanionic solution can optionally be adjusted by adding a basic or acid material or a buffer component. In the embodiment above, for example, a suitable amount of 1 N hydrochloric acid (HCl) or 1 N sodium hydroxide (NaOH) can be added to adjust the pH. After preparing the polyanionic solution, the polycationic solution can be similarly formed. For example, in one embodiment, poly(allylamine hydrochloride) (PAH) having a molecular weight of about 15,000 can be dissolved in water to form a 0.001% solution. The pH can optionally be adjusted as above by adding a suitable amount of hydrochloric acid (HCl) or sodium hydroxide (NaOH).

The formed solutions can then be mixed to form a polyionic coating solution suitable for the method of the present invention. In one embodiment, for example, the solutions above can be mixed slowly to form the coating solution. The amount of each solution applied to the mix depends on the molar charge ratio desired. After mixing, the solution can be filtered if desired.

In accordance with the present invention, a polyionic coating solution (which contains at least one negatively-charged or positively-charged polyionic material or a mixture of at least one negatively-charged or positively-charged polymeric material) of the invention preferably has a pH of 6.0 or less, or more preferably from 2.0 to 6.0.

Examples of suitable ophthalmic lens materials are natural or synthetic organic polymers, or laminates, composites or blends of said materials, in particular natural or synthetic organic polymers or modified biopolymers which are known in large number.

Some examples of polymers are polyaddition and polycondensation polymers (polyurethanes, epoxy resins, polyethers, polyesters, polyamides and polyimides); vinyl polymers (polyacrylates, polymethacrylates, polyacrylamides, polymethacrylamides, polystyrene, polyethylene and halogenated derivatives thereof, polyvinyl acetate and polyacrylonitrile); or elastomers (silicones, polybutadiene and polyisoprene).

A preferred group of ophthalmic lens materials comprises organic polymers selected from polyacrylates, polymethacrylates, polyacrylamides, poly(N,N-dimethylacrylamides), polymethacrylamides, polyvinyl acetates, polysiloxanes, perfluoroalkyl polyethers, fluorinated polyacrylates or -methacrylates and amphiphilic segmented copolymers comprising at least one hydrophobic segment, for example a polysiloxane or perfluoroalkyl polyether segment or a mixed polysiloxane/perfluoroalkyl polyether segment, and at least one hydrophilic segment, for example a polyoxazoline, poly(2-hydroxyethylmethacrylate), polyacrylamide, poly(N,N-dimethylacrylamide), polyvinylpyrrolidone polyacrylic or polymethacrylic acid segment or a copolymeric mixture of two or more of the underlying monomers.

A particularly preferred group of materials to be coated are those being conventionally used for the manufacture of ophthalmic lenses, in particular contact lenses, which include the formulation of lotrafilcon A, lotrafilcon B, etafilcon A, genfilcon A, lenefilcon A, polymacon, acquafilcon A and balafilcon, for example.

In some embodiments of the present invention, the ophthalmic lens can be "pre-conditioned" before contacting with the polyionic coating solution. Pre-conditioning can enhance the ability of the polyionic solution to coat the ophthalmic lens. The application of a solvent solution or solvent, such as an alcohol solution, optionally in the presence of a polyionic component or multiple polyionic components, can allow the ophthalmic lens to swell. After swelling, the ophthalmic lens can then be removed from the solvent solution and be contacted with the polyionic coating solution.

Examples of suitable solvents can include, alcohols such as ethanol, isopropyl alcohol, n-propyl alcohol, hexanol, etc. In a preferred embodiment, the ophthalmic lens is extracted and/or allowed to swell in an alcohol solution containing ethanol or n-propyl alcohol. In a more preferred embodiment, the ophthalmic lens is extracted and/or allowed to swell in an alcohol solution containing ethanol. In another more preferred embodiment, the ophthalmic lens is extracted and/or allowed to swell in an alcohol solution containing n-propyl alcohol.

In some automated manufacturing processes for ophthalmic lenses, the lens material after forming the lens is extracted with a suitable solvent, e.g. to remove undesired monomer components. Said extraction may be used as a pre-conditioning of the lens right away, i.e. the lens can be contacted with the polyionic coating solution after the extraction step without an additional separate pre-conditioning step.

Although not required, pre-conditioning can enhance the "self cascading" of polyionic layers in the coating process.

The present invention may be better understood by reference to the following examples.

EXAMPLES

Synthesis of Silicone-Containing Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degased siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature in the absence of light for several months without any change in molecular weight.

Synthesis of a Lens Forming Material

The siloxane-containing macromer prepared as above is used in preparation of a lens-forming material (Lotrafilcon B), which comprises 25.92% of the siloxane-containing macromer, 19.25% of TRIS (3-tris(trimethyl-siloxy)silylpropyl methacrylate), 28.88% of DMA (N,N-dimethylacrylamide), 24.95% of denatured ethanol, and 1.0% of 2-hydroxy-2-methyl-1-phenyl-o-ene (Darocure® 1173).

Manufacture of an Lotrafilcon B Lens

Female portions of polypropylene lens molds are filled with about 75 microliters of the lens-forming material (Lotrafilcon B) prepared as above, and the molds are closed with the male portion of the polypropylene lens molds (base curve molds). Contact lenses are obtained by curing the closed molds for about 2 hours in a UV cure box equipped with Phillips lights (40 watt, F405) with the top light intensity of about 3.61 mW/cm$^2$ and a bottom light intensity of about 3.54 mW/cm$^2$. The water content of the lenses is about 36% by gravimetric analysis. Contact Angle, measured with the sessile drop method, of de-ionized water on the lens is about 105° (advancing angle) and 73° receding angle.

Example 1

Coating of a Silicone Hydrogel Lens with PAE/CMC in Primary Package

Solution A of 0.2% wt. carboxymethyl cellulose sodium salt (CMC, Mw=90.000 from Sigma-Aldrich) in 0.05 M phosphate buffer (pH=7.2) containing 0.15 M NaCl and Solution C of 0.2% poly amido-amine-epichlorohydrin (PAE, Kymene 217 LX from HERCULES) in 0.05 M phosphate buffer (pH=7.2) containing 0.15 M NaCl were prepared. An uncoated Lotrafilcon B lens was extracted in 96% ethanol aqueous solution for 1 min. The lens was incubated in 0.5 ml of the PAE solution (solution C) in the primary package at room temperature for 60 seconds. 1.0 ml of the CMC solution (solution A) were added and the primary package was sealed and shaken. The precipitation of the polyelectrolytes on the lens surface starts immediately. The primary package was autoclaved at 121° C. for 30 min. The lenses coated with this procedure show a very good wettability (the lens surface is covered by a uniform fluid film) and good comfort on eye. The ingredients of the storage solution (after-coating solution) were tested to be ophthalmically compatible and non toxic (USP 25 elution test) after autoclaving.

Example 2

Coating of a Silicone Hydrogel Lens with CMC/PAE in Primary Package

Solution A of 0.2% wt. carboxymethyl cellulose sodium salt (CMC, Mw=90.000 from Sigma-Aldrich) in 0.05 M phosphate buffer (pH=7.2) containing 0.15 M NaCl and solution C of 0.2% polyamido-amine-epichlorohydrin (PAE, Kymene 217 LX from HERCULES) in 0.05 M phosphate buffer (pH=7.2) containing 0.15 M NaCl were prepared. An uncoated Lotrafilcon B lens was extracted in 96% ethanol aqueous solution for 1 min. The lens was incubated in 1.0 ml of the CMC solution (solution A) in the primary package at room temperature for 60 seconds. 0.5 ml of the PAE solution (solution C) were added and the primary package was sealed and shaken. The precipitation of the polyelectrolytes on the lens surface starts immediately. The primary package was autoclaved at 121° C. for 30 min. The lenses coated with this procedure show a good wettability (the lens surface is covered by a uniform fluid film) and good comfort on eye. The ingredients of the storage solution (after-coating solution) were tested to be ophthalmically compatible and non toxic (USP 25 elution test) after autoclaving.

Example 3

Coating of a Silicone Hydrogel Lens with CMC/PAE in Primary Package with pH Adjustment During Autoclaving Solution A of 0.2% wt. carboxymethyl cellulose sodium salt (CMC, Mw=90.000 from Sigma-Aldrich) in 0.05 M phosphate buffer (pH=7.2) containing 0.15 M NaCl and solution C of 0.2% polyamido-amine-epichlorohydrin (PAE, Kymene 217 LX from HERCULES) in 0.05 M phosphate buffer (pH=7.2) containing 0.15 M NaCl were prepared. An uncoated Lotrafilcon B lens was extracted in 96% ethanol aqueous solution for 1 min. The lens was incubated in 1.0 ml of the CMC solution (solution A) in the primary package at room temperature for 60 seconds. 0.5 ml of the PAE solution (solution C) were added and the primary package was shaken for 30 min. The precipitation of the polyelectrolytes on the lens surface starts immediately. Before sealing the pH of the storage solution was adjusted to 9 by a droplet of concentrated NaOH and an acid tablet was added, which dissolves slowly during autoclaving and which neutralizes the storage solution. The primary package was sealed and autoclaved at 121° C. for 30 min. The lenses coated with this procedure show a very good wettability (the lens surface is covered by a uniform fluid film) and a very good comfort on eye. The ingredients of the storage solution (after-coating solution) were tested to be ophthalmically compatible and non toxic (USP 25 elution test) after autoclaving.

Example 4

Coating of a Silicone Hydrogel Lens with CMC/HCMF in Primary Package

Solution A of 0.15% wt. carboxymethyl cellulose sodium salt (CMC, Mw=90.000 from Sigma-Aldrich) in 0.05 M acetate buffer (pH=5.6) containing 0.15 M NaCl and 0.1% sodium dodecyl sulfate (SDS); and solution C of 0.2% chitosan (HCMF, Hydagen HCMF from COGNIS) in 0.05 M acetate buffer (pH=5.6) containing 0.15 M NaCl were prepared. An uncoated Lotrafilcon B lens was extracted in 96% ethanol aqueous solution. The lens was incubated in 0.4 ml of the CMC solution (solution A) in the primary package at room temperature for 60 seconds. 0.93 ml of the HCMF solution (solution C) were added and the primary package was shaken for 30 min. The precipitation of the polyelectrolytes on the lens surface starts immediately. Before sealing the pH of the storage solution was adjusted to 7.2 by a droplet of concentrated NaOH. The primary package was sealed and autoclaved at 121° C. for 30 min. The lenses coated with this procedure show a very good wettability (the lens surface is covered by a uniform fluid film) and a good comfort on eye. The ingredients of the storage solution (after-coating solution) were tested to be ophthalmically compatible and non toxic (USP 25 elution test) after autoclaving.

Example 5

Contact Angle Testing

Contact angle was measured with the sessile drop method and compared with the commercially available contact lenses Oasys® (Johnson&Johnson) which is known to have a very high comfort on the eye.

| Droplet | Oasys ® Contact Lens | Example 1 | Example 2 | Example 3 | Example 4 | Uncoated Lotrafilcon B lens |
|---|---|---|---|---|---|---|
| ATF | 94° | 92° | 99° | 88° | 40° | 104° |

The measurement is performed by the sessile drop method with a DSA 10 drop shape analysis system from Kruss GmbH, Germany with pure water (Fluka, surface tension 72.5 mN/M at 20° C.) or artificial tear fluid (ATF). For measurement purposes a contact lens is taken off the storage solution with tweezers and excess storage solution is removed by gentle shaking. The contact lens is placed on the male part of a contact lens mold and gently blotted with a dry and clean cloth without rubbing the surface. A droplet of water or of artificial tear fluid (ATF), about 1 µl, is then dosed on the lens apex, and the change of the contact angle over time of this droplet (WCA(t), circle fitting mode) is monitored; WCA is calculated by extrapolation of the graph WCA(t) to t=0.

Example 6

Coating of a Silicone Hydrogel Lens with PSS/PAH in Primary Package

Solution A of 0.2% wt. poly(styrene sulfonic acid, sodium salt) (PSS, Mw=500.000 from Polyscience) in 0.1 M acetate buffer (pH=5.5) containing 0.15 M NaCl and solution C of 0.2% poly(allylamine hydrochloride) (PAH, Mw=15.000 from Aldrich) in 0.1 M acetate buffer (pH=5.5) containing 0.15 M NaCl were prepared. An uncoated Lotrafilcon B lens was extracted in 96% ethanol aqueous solution for 1 min. The lens was incubated in 0.42 ml of the PSS solution (solution A) in the primary package at room temperature for 60 seconds. 0.58 ml of the PAH solution (solution C) was added and the primary package was shaken for 30 min. The precipitation of the polyelectrolytes on the lens surface starts immediately. Before sealing the pH of the storage solution was adjusted to 7.2 by a droplet of concentrated NaOH. The primary package was sealed and autoclaved at 121° C. for 30 min. The lenses coated with this procedure show a good wettability (the lens surface is covered by a uniform fluid film).

Example 7

Coating of a Silicone Hydrogel Lens with PAH/PSS in Primary Package with pH-Adjustment During Autoclaving Solution A of 0.2% wt. poly(styrene sulfonic acid, sodium salt) (PSS, Mw=500.000 from Polyscience) in 0.1 M acetate buffer (pH=5.5) containing 0.15 M NaCl and solution C of 0.2% poly(allylamine hydrochloride) (PAH, Mw=15.000 from Aldrich) in 0.1 M acetate buffer (pH=5.5) containing 0.15 M NaCl were prepared. An uncoated Lotrafilcon B lens was extracted in 96% ethanol aqueous solution for 1 min. The lens was incubated in 0.58 ml of the PAH solution (solution C) in the primary package at room temperature for 60 seconds. 0.42 ml of the PSS solution (solution A) was added and the primary package was shaken for 30 min. The precipitation of the polyelectrolytes on the lens surface starts immediately. Before sealing an alkaline tablet was added, which dissolves slowly during autoclaving and which neutralizes the storage solution. The primary package was sealed and autoclaved at 121° C. for 30 min. The lenses coated with this procedure show a good wettability (the lens surface is covered by a uniform fluid film).

Example 8

Coating of a Silicone Hydrogel Lens with Premixed PSS/HCMF in Primary Package Solution A of 0.2% wt. poly(styrene sulfonic acid, sodium salt) (PSS, Mw=500.000 from Polyscience) in 0.1 M acetate buffer (pH=5.5) containing 0.15 M NaCl and solution C of 0.2% chitosan (HCMF, Hydagen HCMF from Cognis) in 0.1 M acetate buffer (pH=5.5) containing 0.15 M NaCl were prepared. An uncoated Lotrafilcon B lens was extracted in 96% ethanol aqueous solution for 1 min. 0.36 ml of the PSS solution (solution A) were mixed with 0.63 ml of the HCMF solution (solution C) in the primary package at room temperature. The lens was added and the primary package was shaken for 30 min. The precipitation of the polyelectrolytes on the lens surface starts immediately. Before sealing the pH of the storage solution was adjusted to 7.2 by a droplet of concentrated NaOH. The primary package was sealed and autoclaved at 121° C. for 30 min. The lenses coated with this procedure show a good wettability (the lens surface is covered by a uniform fluid film).

Example 9

Coating of a Silicone Hydrogel Lens with PAE/PSS in Primary Package with pH-Adjustment During Autoclaving Solution A of 0.2% wt. poly(styrene sulfonic acid, sodium salt) (PSS, Mw=500.000 from Polyscience) in 0.1 M acetate buffer (pH=5.5) containing 0.15 M NaCl and solution C of 0.2% polyamido-amine-epichlorohydrin (PAE, Kymene 217 LX from HERCULES) in 0.1 M acetate buffer (pH=5.5) containing 0.15 M NaCl were prepared. An uncoated Lotrafilcon B lens was extracted in 96% ethanol aqueous solution for 1 min. An alkaline tablet and 0.58 ml of the PAE solution (solution C) were added to the primary package. The lens was incubated in the PAE solution in the primary package at room temperature. After 60 seconds 0.42 ml of the PSS solution (solution A) were added and the primary package was shaken for 30 min. The precipitation of the polyelectrolytes on the lens surface starts immediately. The primary package was sealed and autoclaved at 121° C. for 30 min. During autoclaving, the alkaline tablet dissolved slowly and neutralized the storage solution. The lenses coated with this procedure show a good wettability (the lens surface is covered by a uniform fluid film).

The invention claimed is:

1. A method for coating an ophthalmic lens in a primary package comprising the steps of:
    (a) forming a first polyionic coating solution comprising at least one positively charged polyionic material which is polyamidoamine epichlorohydrin;
    (b) forming a second polyionic coating solution comprising at least one negatively charged polyionic material;
    (c) forming a coating on an ophthalmic lens by contacting the ophthalmic lens in the primary package with said first polyionic coating solution and adding said second polyionic coating solution to said first polyionic coating solution, wherein the coating comprises said negatively charged material and said positively charged material and the ophthalmic lens with the coating thereon is immersed in a remaining-after-coating solution in the primary package;
    (d) sealing the primary package containing the ophthalmic lens immersed in the remaining after-coating solution;
    (e) autoclaving and then maintaining said coated ophthalmic lens in said primary package with the remaining after-coating solution until insertion of the ophthalmic lens in the eye of the ophthalmic lens user, wherein the remaining after-coating solution in the primary package is ophthalmically compatible and has an osmolarity from 270 to 350 mOsmol/kg.

2. A method according to claim 1, wherein step (c) comprises (c10) dispensing said first polyionic coating solution into a primary package; and (c20) placing an ophthalmic lens into said (first) solution in the primary package.

3. A method according to claim 1, wherein step (c) comprises (c11) placing an ophthalmic lens in the primary package; and (c22) dispensing said first polyionic coating solution into the primary package comprising said ophthalmic lens.

4. A method according to claim 1, wherein the negatively charged polyionic material comprises a poly acrylic acid (PAA), a carboxymethyl cellulose (CMC) or a poly (styrene sulfonate) (PSS).

5. A method according to claim 1, wherein said ophthalmic lens is preconditioned by the steps of:
    providing a solvent;
    allowing the ophthalmic lens to swell in said solvent;
    removing the ophthalmic lens from said solvent after swelling; and
    transferring said ophthalmic lens to step (c) above.

6. A method according to claim 5, wherein said solvent comprises an alcohol.

7. A method for coating an ophthalmic lens in a primary package comprising the steps of:
    (a) forming a first polyionic coating solution comprising at least one negatively charged polyionic material;
    (b) forming a second polyionic coating solution comprising at least one positively charged polyionic material which is polyamidoamine epichlorohydrin;
    (c) forming a coating on an ophthalmic lens by contacting the ophthalmic lens in the primary package with said first polyionic coating solution and adding said second polyionic coating solution to said first polyionic coating solution, wherein the coating comprises said negatively charged material and said positively charged material and the ophthalmic lens with the coating thereon is immersed in a remaining-after-coating solution in the primary package;

(d) sealing the primary package containing the ophthalmic lens immersed in the remaining after-coating solution;

(e) autoclaving and then maintaining said coated ophthalmic lens in said primary package with the remaining after-coating solution until insertion of the ophthalmic lens in the eye of the ophthalmic lens user, wherein the remaining after-coating solution in the primary package is ophthalmically compatible and has an osmolarity from 270 to 350 mOsmol/kg.

8. A method according to claim 7, wherein step (c) comprises (c10) dispensing said first polyionic coating solution into a primary package; and (c20) placing an ophthalmic lens into said (first) solution in the primary package.

9. A method according to claim 7, wherein step (c) comprises (c11) placing an ophthalmic lens in the primary package; and (c22) dispensing said first polyionic coating solution into the primary package comprising said ophthalmic lens.

10. A method according to claim 7, wherein the negatively charged polyionic material comprises a poly acrylic acid (PAA), a carboxymethyl cellulose (CMC) or a poly (styrene sulfonate) (PSS).

11. A method according to claim 7, wherein said ophthalmic lens is preconditioned by the steps of:
providing a solvent;
allowing the ophthalmic lens to swell in said solvent;
removing the ophthalmic lens from said solvent after swelling; and
transferring said ophthalmic lens to step (c) above.

12. A method according to claim 11, wherein said solvent comprises an alcohol.

13. A method for coating an ophthalmic lens in a primary package comprising the steps of:
(a) forming a first polyionic coating solution, said first polyionic coating solution comprising at least one negatively charged polyionic material and at least one positively charged polyionic material which is polyamidoamine epichlorohydrin, wherein the molar charge ratio of said at least one negatively charged polyionic material and at least one positively charged polyionic material is from 1:100 to 100:1, wherein the first polyionic coating solution has a pH of less than 6.0,
(c) forming a coating on an ophthalmic lens by contacting the ophthalmic lens in the primary package with said first polyionic coating solution wherein the coating comprises said negatively charged material and said positively charged material and the ophthalmic lens with the coating thereon is immersed in a remaining-after-coating solution in the primary package;

(d) sealing the primary package containing the ophthalmic lens immersed in the remaining after-coating solution;

(e) autoclaving and then maintaining said coated ophthalmic lens in said primary package with the remaining after-coating solution until insertion of the ophthalmic lens in the eye of the ophthalmic lens user, wherein the remaining after-coating solution in the primary package is ophthalmically compatible and has an osmolarity from 270 to 350 mOsmol/kg.

14. A method according to claim 13, wherein the molar charge ratio of said at least one negatively charged polyionic material and at least one positively charged polyionic material is from 1:10 to 10:1.

15. A method according to claim 13, wherein step (c) comprises (c10) dispensing said first polyionic coating solution into a primary package; and (c20) placing an ophthalmic lens into said (first) solution in the primary package.

16. A method according to claim 13, wherein step (c) comprises (c11) placing an ophthalmic lens in the primary package; and (c22) dispensing said first polyionic coating solution into the primary package comprising said ophthalmic lens.

17. A method according to claim 13, wherein the coating on said ophthalmic lens in step (c) is formed without further action.

18. A method according to claim 13, wherein the negatively charged polyionic material comprises a poly acrylic acid (PAA), a carboxymethyl cellulose (CMC) or a poly (styrene sulfonate) (PSS).

19. A method according to claim 13, wherein said ophthalmic lens is preconditioned by the steps of:
providing a solvent;
allowing the ophthalmic lens to swell in said solvent;
removing the ophthalmic lens from said solvent after swelling; and
transferring said ophthalmic lens to step (c) above.

20. A method according to claim 19, wherein said solvent comprises an alcohol.

* * * * *